United States Patent [19]

Betterton et al.

[11] Patent Number: 4,685,332
[45] Date of Patent: Aug. 11, 1987

[54] LIQUID LEVEL SENSING DEVICE

[75] Inventors: Joseph T. Betterton, Arab; Alfred H. Glover, Decatur, both of Ala.

[73] Assignee: Chrysler Motors Corporation, Highland Park, Mich.

[21] Appl. No.: 882,651

[22] Filed: Jul. 7, 1986

[51] Int. Cl.⁴ .............................................. G01F 23/36
[52] U.S. Cl. ........................................ 73/309; 73/308; 200/84 B; 361/398
[58] Field of Search ......................... 73/308, 313, 309; 361/398; 200/61.42, 84 B; 338/33

[56] References Cited

U.S. PATENT DOCUMENTS

| | | | |
|---|---|---|---|
| 317,289 | 5/1885 | Boyle | 338/33 X |
| 1,988,192 | 1/1935 | Drabin | 338/33 X |
| 2,266,298 | 12/1941 | Bacon | 338/33 |
| 2,305,973 | 12/1942 | Marchment | 73/313 X |
| 3,826,139 | 7/1974 | Bachman | 200/84 C X |
| 3,873,889 | 3/1975 | Leyba | 361/398 X |
| 4,052,901 | 10/1977 | Bjork | 73/313 |
| 4,227,057 | 10/1980 | Kubler | 73/313 X |

Primary Examiner—Daniel M. Yasich
Attorney, Agent, or Firm—Kenneth H. MacLean, Jr.

[57] ABSTRACT

A liquid level sensing device utilizing a conductive hollow sphere buoyed by the liquid and guided vertically within a metal tube. An elongated resistance card is mounted in the tube adjacent the sphere to permit the sphere to slide along its surface as the liquid level changes thereby electrically connecting a portion of the resistance card to the metal housing through the conductive sphere. The resistance card is mounted so as to be flexed from its normal flat configuration with the flexed configuration producing a light force on the sphere to maintain good electrical contact therewith and between the sphere and the housing but insufficient to deter the sphere from following liquid level changes.

5 Claims, 4 Drawing Figures

LIQUID LEVEL SENSING DEVICE

BACKGROUND OF THE INVENTION

This invention relates to a liquid level sensing device useful in a fuel tank for a vehicle, for example, to sense the fuel level therein. The subject liquid level sensing device utilizes a conductive hollow sphere which floats on the liquid surface within a vertically oriented tube. Fuel is free to flow into and out of the tube so that the level of fuel within the tube is the same as the fuel level in the surrounding tank. An elongated resistance card is mounted in the tube in a manner so that the hollow metal sphere slides along the resistance card. Another portion of the hollow metal sphere touches the opposite wall of the metal tube thereby providing a variable resistance connection between the card and the ground which is connected to the metal tube.

A number of prior liquid sensing devices have utilized level sensors with a floating sphere. The U.S. Pat. No. 2,305,973 to Marchment utilizes a metal ball which is buoyed by the liquid level and slides against a wire wound resistance element in the form of an elongated rod with wraps of wire thereabout. The floating metal ball is biased against the wire wound resistor by means of an electromagnetically energized biasing device so that when the electromagnet is energized, the ball is pressed against the wire wound resistance so that a liquid level reading may be taken. It is not possible with this device to continuously monitor liquid levels since the energization of the electromagnet firmly presses the metal ball against the resistance coil and prevents the ball from sliding therealong when the liquid level changes. A similar structure is also shown in U.S. Pat. No. 2,260,913 to Marchment.

A number of patents utilize floats which are guided by stationary means as they move with liquid level changes. The following U.S. patents are of this type: U.S. Pat. Nos. 3,348,413 to Zimmerle; 3,433,073 to Kunert; 3,555,904 to Lenker; 3,813,941 to Miguel; 4,178,802 to Yamamoto. Some of the above patents utilize floats which travel along vertically oriented and elongated resistance devices. Other patents disclose the use of a plastic type resistance card device which is also used in the subject application. In this regard, U.S. Pat. No. 4,052,901 to Bjork discloses the use of a flexible plastic transducer for liquid level sensing. The flexible transducer is provided with a photo-etched pattern of electrical conductor. Similarly, U.S. Pat. No. 4,157,038 to Yamamoto utilizes a similar resistance card type transducer.

SUMMARY OF THE INVENTION

The subject liquid level sensing device utilized a hollow metallic sphere or ball which floats on the liquid surface and is guided in vertical movement with liquid changes by the combination of a tubular metal housing in which the ball resides and a flexible plastic resistance card also contained within the tubular housing. Unlike what is known in the prior art, the floating ball slides along the inside of the tube and also against the resistance card. The resistance card is mounted in the tubular housing so as to flex the resistance card from its normal planar configuration into a curved shape thus defining a shallow channel which extends parallel to the axis of the metal tube. The floating metal ball is sized to occupy the space within the tubular housing formed by the channel and an opposite wall of the housing. Thus, the ball is free to move vertically with liquid level changes while sliding along the wall of the tubular housing, as well as sliding along the surface of the flexible resistance card.

The aforesaid construction provides a simple yet very reliable construction for liquid level sensing utilizing a minimum number of parts, as well as very simply formed and configured elements.

Therefore, an advantage of the subject liquid level sensing device is the provision of a flexible resistance card within a tubular metal housing to define therebetween an elongated guide means for a floating metal level sensor which is biased into electrical contact with the housing, as well as with the flexible resistor by means of the resilient characteristics of the resistor itself.

Other objects and advantages of the subject sensing device will be more readily apparent to a skilled person upon a reading of the following detailed description of the preferred embodiment which is illustrated in the drawings.

IN THE DRAWINGS

DETAILED DESCRIPTION OF AN EMBODIMENT

Figure 1:
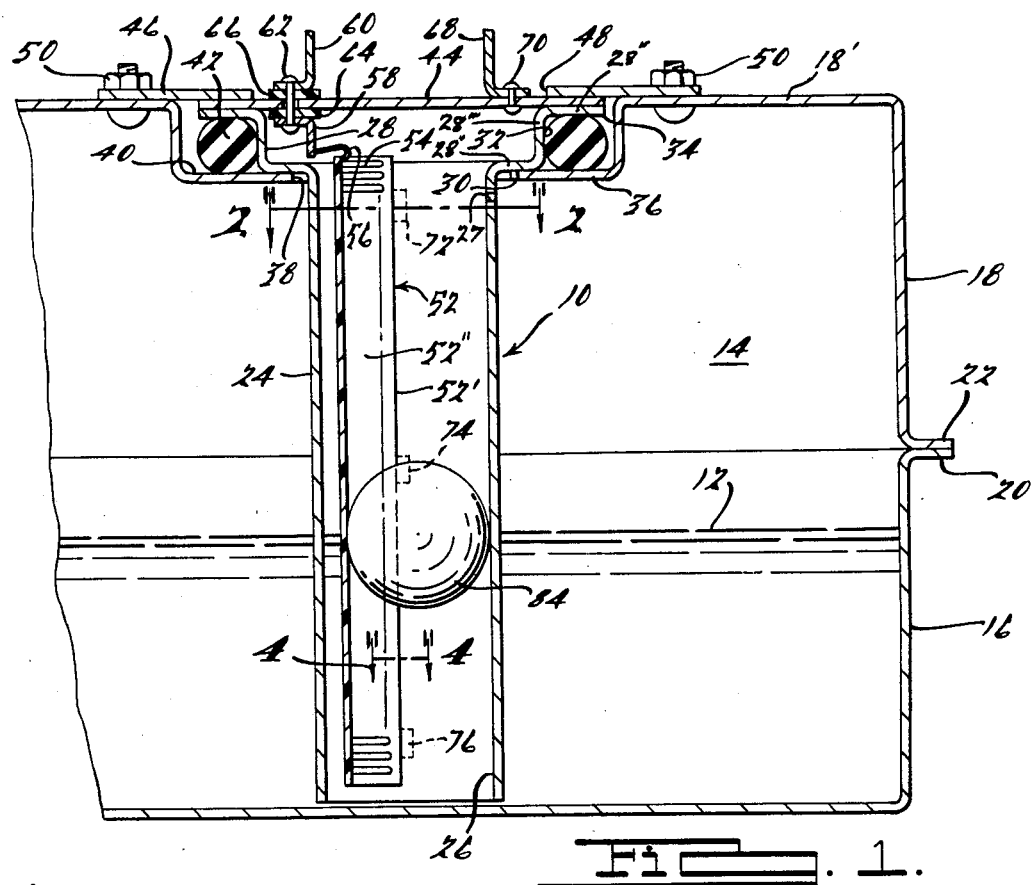
FIG. 1 is a partially sectioned view of a fuel tank with liquid therein and including an elevational sectioned view of the subject liquid level sensor.

In FIG. 1, a liquid level sensing device or assembly 10 is shown and is for the purpose of continuously indicating the level of liquid 12 within the interior 14 of a fuel tank such as used in a vehicle. The fuel tank is formed by a substantially cup-shaped bottom portion 16 and a substantially cup-shaped top portion 18. The bottom and top portions 16 and 18 have peripheral outwardly turned flange portions 20 and 22 which are adapted to lie against one another to define the interior 14 of the fuel tank. The flange portions 20, 22 are adapted to be joined together by commonly used techniques such as welding or mechanically joining the flanges together to form a leak-proof connection between portions 16 and 18.

The liquid level sensor assembly 10 includes a tubular metal housing 24 which extends with its axis vertically within the fuel tank and has an open lower end 26. The end 26 is slightly spaced from the fuel tank bottom portion 16 to permit the flow of fuel 12 into and out of the interior of the hollow cylinder or housing 24. To facilitate this flow, a small air bleed opening 27 is formed near the upper end of the cylindrical housing 24.

The housing 24 is supported in the fuel tank at an upper end where a double flange portion 28 is formed in the upper end of the housing 24. Specifically, the upper end has a first radially outwardly extending portion 28' and a second outwardly extending portion 28" interconnected by an axially extending portion 28"'. The first radially extending outward portion 28' defines a surface 30. The portion 28''' defines an outer cylindrical surface 32 and the second flange portion 28'' defines a surface 34. The upper wall 18' of the portion 18 of the fuel tank is formed into a shallow cylindrical indentation including an inwardly spaced wall portion 36 with respect to the interior 14 of the fuel tank. The portion 36 is formed with a circular aperture 38 through which the lower portion of the tubular housing 24 extends. The first radially outwardly extending flange portion 28' of the housing 24 rests against the upper surface 40 surrounding the aperture 38 to support the tubular housing 24 within the fuel tank. An annularly shaped O-ring type seal 42 is slightly compressed between the second radially outwardly extending portion 28'' and the portion 36 of the fuel tank. The annularly shaped O-ring type seal 42 encircles the portion 28''' of the tubular housing 24. This provides a leakproof connection between the housing 24 and the fuel tank portion 18.

The upper end of the tubular housing 24 is sealingly covered by a top end plate 44 which also serves as a ter.inal support member, Specifically, the end plate 44 is secured to the portion 28'' of the tubular housing 24 by welding or similar attachment means. The housing 24 and, specifically, the end plate 44 are secured to the fuel tank by means of an annularly shaped fastener plate 46 which has a central aperture 48 so as to cause the fastening plate 46 to bear only against the outer edge portion of the end plate 44. The fastening plate 46 is attached to the upper wall 18' of fuel tank portion 18 by means of a plurality of nut and bolt fasteners 50 as shown in FIG. 1. A person knowledgeable in the art will readily understand that other fastening means are readily available and equally suitable.

Figure 3:
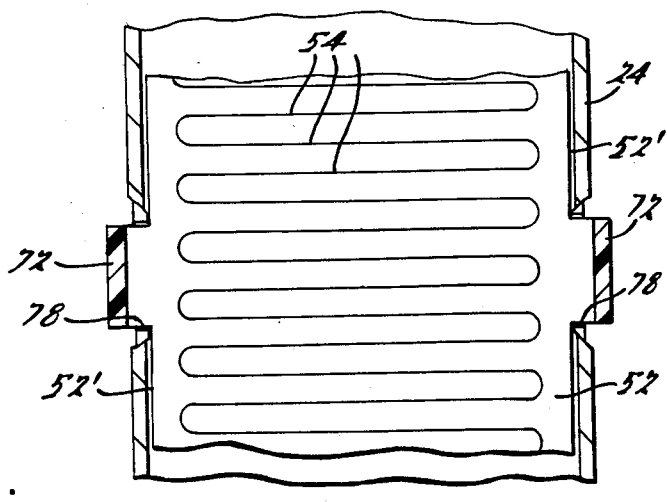
FIG. 3 is an enlarged sectioned view of the device taken along section line 3—3 in FIG. 2 and looking in the direction of the arrow.

The tubular housing 24 defines the cylindrical interior thereof which is filled with liquid to a level corresponding to a level 12 in the fuel tank as previously explained. An elongated rectangularly shaped and thin dimensioned resistor board or cards 52 is supported within the interior of the tubular housing 24. The resistor board 52 is made of relatively flexible plastic material and is flat in an unflexed condition with a pair of elongated and parallel edge portions 52' (one shown in FIG. 1) which extend along the interior wall of the housing 24. The resistor board 52 has a generally sinusoidally shaped grid 54 which is etched onto its surface 52''. This etching is best shown in FIG. 3 and forms the generally sinusoidally shaped grid with substantially parallel portions across the board 52. Thus, this grid is made up of a continuous conductor having a significant resistance from the top end to the bottom end of the resistor card 52. The top end of the resistor card and, specifically, the conductive grid has a lead 56 extending from the board to an interior terminal tab 58. The interior terminal tab 58 is supported by the end plate 44 and is electrically connected to an external terminal tab 60 by means of a conductive rivet type fastener 62 which extends through an oversized opening in the end plate 44. The tabs 58 and 60 are electrically insulated from the end plate 44 by means of insulative spacers 64, 66 on the interior and exterior surface of the end plate 44. As previously mentioned, the rivet 62 extends through an oversized opening in the end plate 44 and, thus, is electrically isolated therefrom. Also supported by the end plate 44 is a ground terminal 68 which is attached to the exterior surface of the plate 44 by means of a rivet fastener 70. Because the ground terminal 68 is intended to be an electrical contact with the tubular housing 24, the terminal 68 and rivet 70 engage the end plate 44 in electrical conductive relation thereto.

Figure 2:
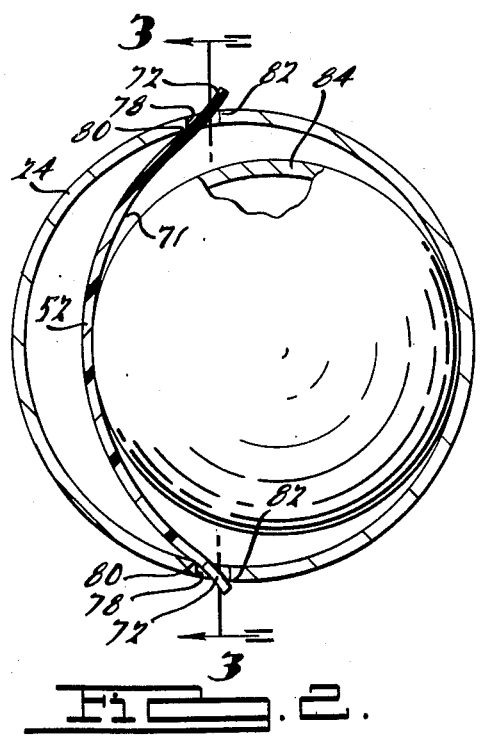
FIG. 2 is an enlarged end sectioned view of the level sensor shown in FIG. 1 taken along section line 2—2 and looking in the direction of the arrow.
Figure 4:
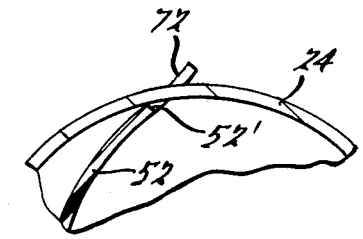
FIG. 4 is an enlarged fragmentary sectioned view taken along section line 4—4 in FIG. 1 and looking in the direction of the arrow.

It is clear from FIG. 2, particularly, that the resistor card 52 is supported within the interior of the tubular housing 24 and is flexed from a normal unassembled flat or planar configuration to the assembled and curved configuration shown in the figure. This curved configuration forms a generally shallow channel 71 which extends along the length of the resistor card parallel to the axis of the tubular housing 24. The resistor card 52 is supported and fixed within the housing 24 by means of two opposite upper tabs 72, two opposite middle tabs 74 and two opposite lower tabs 76 which extend from the opposite edge portions 52' of the resistor card 52 through appropriately spaced openings 78 in the wall of the tubular housing 24. It is noted that the openings 78 are significantly wide as shown in FIG. 2 to permit the tabs to extend therethrough at an angle and to permit the tabs to move slightly inward and outward of the openings. Specifically, the openings 78 within the housing 24 define an inner edge 80 and an outer edge 82 which specifically engage the tabs. Thus, the resistor card 52 is axially fixed within the housing 24. However, the midportion of the flexible resistor card 52 is permitted to move radially outward and inward a slight distance with respect to the axis of the tubular housing 24. The slight flexing accommodates the axial movement within the housing 24 of a hollow metallic sphere 84 adapted to be buoyed by the liquid 12 within the fuel tank. Specifically, the sphere 84 moves in an axial direction when the liquid level 12 changes within the fuel tank. Accompanying this axial movement of the sphere 84, portions on opposite sides of the sphere engage the interior surface of the tubular housing 24 and the midportion of the resistor card 52. The flexibility or resiliency of the resistor card 52 maintains good contact between the metal sphere 84 and the resistor card, as well as good grounding contact between the sphere 84 and the interior surface of the tubular housing 24.

It can be readily understood that the contact between the resistor card 52 and, specifically, selective portions 54 of the resistance grid and the metal sphere will cause a closed electrical circuit between the insulated terminal 60 and the grounded terminal 68 connected to the tubular housing 24. As the sphere 84 moves vertically in an axial direction within the tubular housing 24, a contact between the resistive grid 54 and the grounded housing produces a variable resistance between terminals 60 and 68 which can be used to produce a corresponding selective positioning of an indicator or fuel level in the passenger compartment of a vehicle, for instance.

In manufacturing the resistance card, it is important that the thickness and material be selected to produce desired flexibility and resiliency so that the good electrical contact be made between the metal sphere and with the grounded housing. However, it is not desired to produce an overly large bias by the flexible resistor card against the metal sphere so that the ball 84 will significantly resist axial movements with respect to the housing caused by liquid level changes. Normally, the average density of fuel within a fuel tank is about 45 pounds per cubic foot, thus one cubic inch of liquid equals approximately 0.026 pounds or 11.81 grams per cubic inch. It has been assumed that a miminum contact force of 18 grams is needed between the metallic ball and the resistance card, as well as with the housing. It is found that a coefficient of friction of about 0.53 exists between a copper sphere and a typical resistor card. Multiplying 18 grams by 0.53 produces a 9.54 grams of force required to act on the contact or the ball. Thus, the ball must weigh about 9.54 grams so that it will follow the fluid level as it descends. A buoyant force of at least an additional 9.54 grams must be provided to support the 9.54 grams. Also, an additional 9.54 grams is needed for a total of about 19.08 grams of minimum fluid displacement. Dividing the minimum displacement of fluid by the density of the gasoline fuel, or dividing 19.08 by 11.81 produces a minimum volume of 1.616 cubic inches. Using the formula for the volume of a sphere, the diameter of the ball must equal about 1.456 inches.

Although only one embodiment has been described in detail and illustrated in the drawings, other embodiments would be apparent to a person skilled in the art which still would fall within the scope of the following claims.

We claim:

1. A liquid level transducer for fuel tanks and the like comprising:
    an elongated tubular housing having an axis and being of electrically conductive material including means for facilitating liquid flow into and out of its interior as liquid levels change thereabout;
    means supporting the elongated tubular housing in the liquid with the axis thereof vertically oriented;
    an elongated and normally flat resistor card of relatively flexible material supported in the tubular housing;
    an electrically conductive sphere within the tubular housing positioned between the resistor card and an interior surface of the housing and being buoyed by the liquid to move along the surface of the resistor card in the direction of the housing axis as the liquid level changes;
    the flexible resistor card having a width dimension greater than the interior dimension of the tubular housing thereby causing the resistor card to be flexed from a normally flat configuration to a curved configuration forming a shallow channel parallel to the housing axis, whereby the sphere moves along the channel and is pressed against the housing by the resilient forces of the flexed resistor card tending to return the card to a normally flat configuration.

2. The transducer set forth in claim 1 in which the resistor card includes a plastic base portion with a plurality of tabs extending from opposite side edges and the housing including openings for reception of the tabs to axially fix the card within the housing while permitting limited additional flexing of the card accommodated by movement of the tabs within the openings.

3. The transducer as set forth in claim 1 in which the resistor card has a continuous conductive path formed thereon including a plurality of series connected portions spaced from one end of the elongated resistor card to the other end whereby the conductive sphere engages the resistor card at a location corresponding to the liquid level and electrically connects with the abutting portion of the series connected portions to complete an electrical connection through the conductive sphere and the conductive housing.

4. The transducer set forth in claim 1 in which the conductor is a hollow metallic sphere having a sufficient buoyed force in the liquid to permit the metal sphere to slide along the resistor card and the inner surface of the housing in accord with changes of liquid level within the housing.

5. The transducer as set forth in claim 1 in which the tubular housing has an outwardly flared upper end portion extending in spaced relation to a support surface;
    an annular seal member between the outwardly extending surface and the support surface to prevent leakage of liquid past the housing.

* * * * *